United States Patent
Huang et al.

(10) Patent No.: US 11,734,799 B2
(45) Date of Patent: Aug. 22, 2023

(54) POINT CLOUD FEATURE ENHANCEMENT AND APPARATUS, COMPUTER DEVICE AND STORAGE MEDIUM

(71) Applicant: Shenzhen University, Shenzhen (CN)

(72) Inventors: Hui Huang, Shenzhen (CN); Liqiang Lin, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 109 days.

(21) Appl. No.: 17/498,754

(22) Filed: Oct. 12, 2021

(65) Prior Publication Data

US 2022/0358621 A1 Nov. 10, 2022

(30) Foreign Application Priority Data

Apr. 26, 2021 (CN) .......................... 202110452686.8

(51) Int. Cl.
*G06T 5/00* (2006.01)
*G06V 10/46* (2022.01)
*G06V 10/48* (2022.01)

(52) U.S. Cl.
CPC .............. *G06T 5/00* (2013.01); *G06V 10/462* (2022.01); *G06V 10/48* (2022.01); *G06T 2207/10028* (2013.01); *G06T 2207/20221* (2013.01)

(58) Field of Classification Search
CPC ............ G06T 5/00; G06T 2207/10028; G06T 2207/20221; G06V 10/462; G06V 10/48
See application file for complete search history.

(56) References Cited

U.S. PATENT DOCUMENTS

| 10,438,371 | B2 * | 10/2019 | Xu ............................ G06T 7/73 |
| 10,970,518 | B1 * | 4/2021 | Zhou ......................... G06T 7/73 |
| 11,100,669 | B1 * | 8/2021 | Zhou ..................... G01S 13/867 |
| 11,182,612 | B2 * | 11/2021 | Liu ........................... G06T 7/74 |
| 11,380,086 | B2 * | 7/2022 | Yu ........................... G06F 18/22 |
| 11,443,481 | B1 * | 9/2022 | Yin .......................... G06N 3/045 |
| 11,507,615 | B2 * | 11/2022 | Luo ........................ G06V 10/82 |
| 2014/0320491 | A1 * | 10/2014 | Dai .......................... G06T 17/00 345/420 |
| 2021/0173966 | A1 * | 6/2021 | Li ........................... G06F 30/10 |
| 2022/0164597 | A1 * | 5/2022 | Ye .......................... G06V 10/82 |

* cited by examiner

*Primary Examiner* — Gregory M Desire
(74) *Attorney, Agent, or Firm* — Kilpatrick Townsend & Stockton, LLP (57) ABSTRACT

The present disclosure relates to a point cloud feature enhancement and apparatus, a computer device and a storage medium. The method includes: acquiring a three-dimensional point cloud, the three-dimensional point cloud including a plurality of input points; performing feature aggregation on neighborhood point features of the input point to obtain a first feature of the input point; mapping the first feature to an attention point corresponding to the corresponding input point; performing feature aggregation on neighborhood point features of the attention point to obtain a second feature of the corresponding input point; and performing feature fusion on the first feature and the second feature of the input point to obtain a corresponding enhanced feature. An enhancement effect of point cloud features can be improved with the method.

9 Claims, 5 Drawing Sheets

POINT CLOUD FEATURE ENHANCEMENT AND APPARATUS, COMPUTER DEVICE AND STORAGE MEDIUM

This application claims priority to Chinese application No. 2021104526868, entitled "POINT CLOUD FEATURE ENHANCEMENT AND APPARATUS, COMPUTER DEVICE AND STORAGE MEDIUM", filed on Apr. 26, 2021, the contents of which are incorporated by reference herein in their entirety.

FIELD

The present disclosure relates to the field of computer graphics technologies, and in particular, to a point cloud feature enhancement and apparatus, a computer device and a storage medium.

BACKGROUND

With the development of computer graphics technologies, three-dimensional vision tasks such as point cloud classification and point cloud segmentation based on a three-dimensional point cloud are gradually developing. Generally, after a reality scene or object is scanned by a measuring instrument such as a lidar sensor, a three-dimensional point cloud representation of the object in a three-dimensional space can be obtained, and a three-dimensional shape of the object can be analyzed by analyzing three-dimensional point cloud features. Therefore, extraction of the three-dimensional point cloud features is one of the basic tasks of the three-dimensional vision tasks. Therefore, how to better extract the three-dimensional point cloud features to achieve a better effect in subsequent visual tasks based on the extracted three-dimensional point cloud features is a problem worthy of attention.

Currently, the extraction of the three-dimensional point cloud features mainly focuses on learning of local features. Although point cloud feature learning based on an attention mechanism exists, in a current point cloud feature learning method based on the attention mechanism, a set of fixed points are required to be pre-selected as attention points, and better attention points cannot be automatically selected depending on different three-dimensional point clouds. Therefore, such a point cloud feature learning method has a poor enhancement effect on learned point cloud features.

SUMMARY

In view of the above, there is a need to provide, with respect to the above problem, a point cloud feature enhancement and apparatus, a computer device and a storage medium that can improve an enhancement effect of point cloud features.

A point cloud feature enhancement method is provided, which includes:
acquiring a three-dimensional point cloud, the three-dimensional point cloud including a plurality of input points;
performing feature aggregation on neighborhood point features of the input point to obtain a first feature of the input point;
mapping the first feature to an attention point corresponding to the corresponding input point;
performing feature aggregation on neighborhood point features of the attention point to obtain a second feature of the corresponding input point; and
performing feature fusion on the first feature and the second feature of the input point to obtain a corresponding enhanced feature.

In one embodiment, the step of mapping the first feature to an attention point corresponding to the corresponding input point includes:
mapping the first feature of the input point to a target offset vector; and
determining the corresponding attention point according to the input point and the target offset vector.

In one embodiment, the target offset vector is a coordinate offset vector in a Euclidean space; and the step of determining the corresponding attention point according to the input point and the target offset vector includes:
obtaining an offset point coordinate vector according to a coordinate vector of the input point in the Euclidean space and the coordinate offset vector; and
determining the attention point corresponding to the corresponding input point according to the offset point coordinate vector.

In one embodiment, the target offset vector is a feature offset vector in a feature space; and the step of determining the corresponding attention point according to the input point and the target offset vector includes:
obtaining an offset point feature vector according to a feature vector of the input point in the feature space and the feature offset vector; and
determining the attention point corresponding to the corresponding input point according to the offset point feature vector.

In one embodiment, the step of mapping the first feature of the input point to a target offset vector includes:
mapping the first feature of each input point in the three-dimensional point cloud to the corresponding target offset vector through a multi-layer perceptron sharing parameters.

In one embodiment, the step of performing feature aggregation on neighborhood point features of the attention point to obtain a second feature of the corresponding input point includes:
determining neighborhood points and the corresponding neighborhood point features of the attention point from the three-dimensional point cloud; and
performing feature aggregation on the determined neighborhood point features through local convolution to obtain the second feature of the input point corresponding to the corresponding attention point.

In one embodiment, the step of determining neighborhood points and the corresponding neighborhood point features of the attention point from the three-dimensional point cloud includes:
determining a preset number of neighborhood points and corresponding neighborhood point features from the three-dimensional point cloud according to a coordinate vector of the attention point; or
determining a preset number of neighborhood points and corresponding neighborhood point features from the three-dimensional point cloud according to a feature vector of the attention point.

A point cloud feature enhancement apparatus is also provided, which includes:
an acquisition device configured to acquire a three-dimensional point cloud, the three-dimensional point cloud including a plurality of input points;
a feature aggregation device configured to perform feature aggregation on neighborhood point features of the input point to obtain a first feature of the input point;

an attention point mapping device configured to map the first feature to an attention point corresponding to the corresponding input point;

the feature aggregation device being further configured to perform feature aggregation on neighborhood point features of the attention point to obtain a second feature of the corresponding input point; and a feature fusion device configured to perform feature fusion on the first feature and the second feature of the input point to obtain a corresponding enhanced feature.

A computer device is also provided, which includes a memory and a processor, the memory storing a computer program, and the processor, when executing the computer program, implements the following steps:

acquiring a three-dimensional point cloud, the three-dimensional point cloud including a plurality of input points;

performing feature aggregation on neighborhood point features of the input point to obtain a first feature of the input point;

mapping the first feature to an attention point corresponding to the corresponding input point;

performing feature aggregation on neighborhood point features of the attention point to obtain a second feature of the corresponding input point; and performing feature fusion on the first feature and the second feature of the input point to obtain a corresponding enhanced feature.

A computer-readable storage medium is also provided, which has a computer program stored thereon, wherein when the computer program is executed by a processor, the following steps are implemented:

acquiring a three-dimensional point cloud, the three-dimensional point cloud including a plurality of input points;

performing feature aggregation on neighborhood point features of the input point to obtain a first feature of the input point;

mapping the first feature to an attention point corresponding to the corresponding input point;

performing feature aggregation on neighborhood point features of the attention point to obtain a second feature of the corresponding input point; and performing feature fusion on the first feature and the second feature of the input point to obtain a corresponding enhanced feature.

According to the point cloud feature enhancement method and apparatus, the computer device and the storage medium, after a three-dimensional point cloud of a to-be-enhanced point cloud feature is acquired, for each input point in the three-dimensional point cloud, a feature of the input point is enhanced based on neighborhood point features of the input point to obtain a corresponding first feature, an attention point corresponding to the input point is automatically learned based on the feature-enhanced first feature, a feature of the attention point is enhanced based on neighborhood point features of the learned attention point and is taken as a second feature of the corresponding input point, the feature of the input point is further enhanced by fusing the second feature of the input point to the corresponding first feature, and an enhanced feature with a better enhancement effect is obtained, so that a point cloud feature with a better enhancement effect can be obtained based on the enhanced feature of each input point, to improve an enhancement effect of the point cloud feature.

DETAILED DESCRIPTION OF THE EMBODIMENTS

Embodiments of the present disclosure are described in further detail below with reference to the accompanying drawings and embodiments. It should be understood that specific embodiments described herein are intended only to interpret the present disclosure and not intended to limit the present disclosure.

Figure 1:
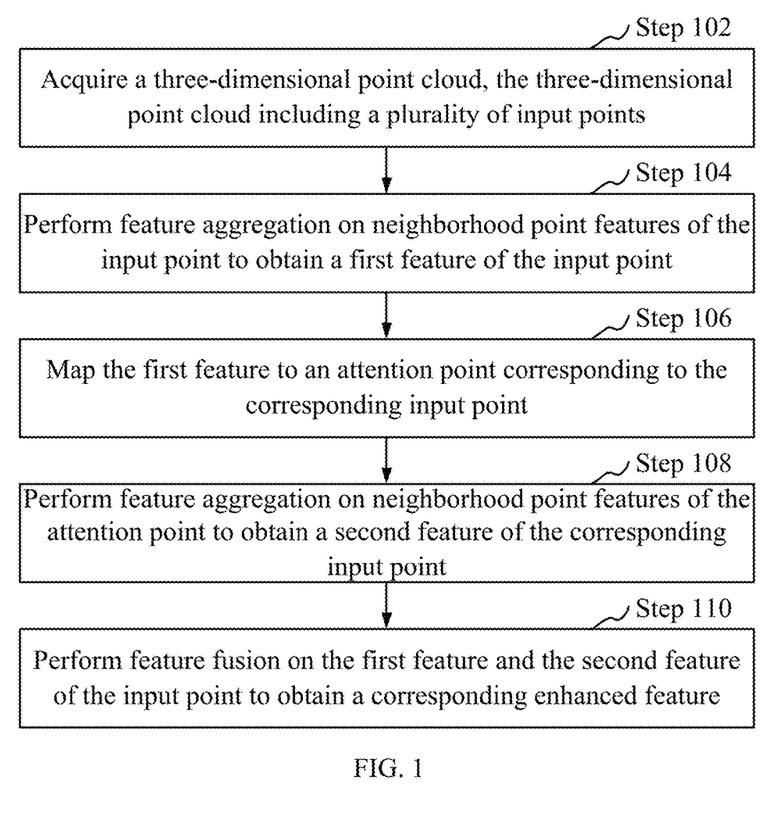
FIG. 1 is a schematic flowchart of a point cloud feature enhancement method according to an embodiment.

In one embodiment, as shown in FIG. 1, a point cloud feature enhancement method is provided. The present embodiment is illustrated with an example in which the method is applied to a terminal. It may be understood that the method may also be applied to a server or a system including a terminal and a server, and is implemented through interaction between the terminal and the server. In the present embodiment, the method includes the following steps.

In step 102, a three-dimensional point cloud is acquired, the three-dimensional point cloud including a plurality of input points.

The three-dimensional point cloud is a set of some points in a three-dimensional space. Each point in the three-dimensional point cloud may be understood as an input point. A point cloud feature can be enhanced by enhancing a feature of the input point.

In step 104, feature aggregation is performed on neighborhood point features of the input point to obtain a first feature of the input point.

In one embodiment, for each input point in the three-dimensional point cloud, the terminal determines a neighborhood point set of the input point from the three-dimensional point cloud, acquires a neighborhood point feature of each neighborhood point in the neighborhood point set, performs feature aggregation on the neighborhood point features, and updates an initial feature of the input point based on the aggregated feature to obtain the first feature of the input point.

In one embodiment, the terminal performs feature aggregation on neighborhood point features of each input point through local convolution to obtain a first feature of the corresponding input point. The terminal may specifically perform a local convolution operation on the neighborhood point features of each input point to obtain the corresponding first feature in the following manner.

$$f_i = \text{LocalConv1}(N(p_i))$$

where $p_i$ denotes an $i^{th}$ input point in the three-dimensional point cloud, $N(p_i)$ denotes a neighborhood point set of the input point $p_i$, $f_i$ denotes a first feature of the input point $p_i$, and LocalConv1 denotes any local convolution operator, which may be, for example, a local operator for point-by-point operation, a local operator based on grid convolution kernel, or an attention-based local operator. The local convolution operator generally takes the neighborhood point features of the input points as input to perform feature aggregation on the inputted neighborhood point features as the first feature of the input point.

In one embodiment, for each input point in the three-dimensional point cloud, the terminal calculates distances between the input point and other input points in the three-dimensional point cloud, and screens neighborhood points of the input point based on the distances to obtain a corresponding neighborhood point set. The neighborhood points of the input point are screened from the three-dimensional point cloud based on the distances in, but not limited to, the following manner. The terminal may screen, from the three-dimensional point cloud, the input points with distances less than or equal to a preset distance threshold to serve as the neighborhood points. In this way, by taking a ball center as an input point and a ball with a radius of the preset distance threshold as a query ball, input points within a range of the query ball are screened from the three-dimensional point cloud to serve as the neighborhood points. It may be understood that, in the neighborhood point screening manner, no neighborhood point may exist in the query ball due to a too large target offset vector of the input point. In this case, during automatic learning of the target offset vector based on the first feature, a penalty is further required to be added to a loss function to prevent a too large target offset vector. The terminal may also screen, from the three-dimensional point cloud, a preset number of input points with a minimum distance to serve as the neighborhood points. In this way, a preset number of input points closest to the input point are screened from the three-dimensional point cloud based on the distances to serve as the neighborhood points. It may be understood that the preset distance threshold and the preset number may be customized as required. The distance between the input points may be a vector distance calculated based on coordinate vectors or feature vectors of the input points.

In step 106, the first feature is mapped to an attention point corresponding to the corresponding input point.

In one embodiment, for each input point in the three-dimensional point cloud, the terminal performs feature learning based on the first feature of the input point, and determines an attention point of the input point based on a learned feature, to map the first feature of the input point to the corresponding input point. In this way, the terminal can automatically learn the attention point of each input point based on the first feature of the input point.

In one embodiment, the terminal maps the first feature of each input point to the corresponding input point by means of a multi-layer perceptron. It may be understood that the multi-layer perceptron is parameter-sharing among the input points.

In one embodiment, the terminal learns an offset point of the input point based on the first feature of the input point, and searches the three-dimensional point cloud for an input point closest to the offset point as the attention point. In this way, the terminal learns the offset point based on the first feature of the input point, and searches, under the guidance of the offset point, the three-dimensional point cloud for the input point closest to the offset point as the attention point related to the corresponding input point.

It may be understood that, when the three-dimensional point cloud is searched for the attention point of the corresponding input point based on the offset point, a distance between the offset point and each input point in the three-dimensional point cloud is required to be calculated, and when the three-dimensional point cloud is further searched for neighborhood points of the attention point to determine a second feature of the corresponding input point based on the found neighborhood points, a distance between the attention point and each input point in the three-dimensional point cloud is required to be calculated. Therefore, during the determination of the second feature of the corresponding input point based on the offset point of the input point, each input point in the three-dimensional point cloud is required to be traversed twice, and a distance between the traversed input point and the offset point/attention point is calculated; that is, two groups of distances are required to be calculated. In order to reduce calculation costs caused by calculation of the two groups of distances, the offset point can be directly regarded as the attention point, and the second feature of the corresponding input point can be determined based on neighborhood point features of the offset point, so that when the feature of the corresponding input point is further enhanced based on the second feature, the calculation costs can be reduced and the processing efficiency can be improved in a case where a feature enhancement effect is ensured.

In step 108, feature aggregation is performed on neighborhood point features of the attention point to obtain a second feature of the corresponding input point.

In one embodiment, for the attention point corresponding to each input point, the terminal determines a neighborhood point set of the attention point from the three-dimensional point cloud, acquires a neighborhood point feature of each neighborhood point in the neighborhood point set, performs feature aggregation on the neighborhood point features, updates a feature of the corresponding attention point based on the aggregated feature, and takes the updated feature of the attention point as the second feature of the corresponding input point.

In step 110, feature fusion is performed on the first feature and the second feature of the input point to obtain a corresponding enhanced feature.

In one embodiment, for each input point in the three-dimensional point cloud, the terminal fuses the second feature of the input point to the corresponding first feature to further enhance the feature of the input point to obtain the corresponding enhanced feature. It may be understood that the terminal may fuse the first feature and the second feature of each input point by using an existing feature fusion operation, which is not specifically limited herein.

In one embodiment, the terminal performs feature fusion on the first feature and the second feature of each input point through a fusion function I to obtain the corresponding enhanced feature, which may specifically refer to the following formula:

$$f'_i = I(f_{p_i}, f_{q_i})$$

where $f'_i$ denotes an enhanced feature of the $i^{th}$ input point $p_i$, $f_{p_i}$ denotes a first feature of the input point $p_i$, that is, $f_i$, and $f_{q_i}$ denotes a second feature of the input point $p_i$.

In one embodiment, the terminal adds the first feature and the second feature of the input point through a fusion function ≡ to obtain the enhanced feature, which may specifically refer to the following formula: where ≡ denotes a feature summing operation:

$$I = \mathrm{Add}(f_{p_i}, f_{q_i})$$

In one embodiment, the terminal connects the first feature and the second feature of the input point through a fusion function ▨ and reduces a dimension through a multi-layer perceptron to obtain the enhanced feature, which may specifically refer to the following formula: where Concatenate denotes a feature concatenate operation, and MLP denotes reduction of a feature dimension through the multi-layer perceptron.

$$I = MLP * Cocatenate(f_{p_i}, f_{q_i}))$$

According to the point cloud feature enhancement method, after a three-dimensional point cloud of a to-be-enhanced point cloud feature is acquired, for each input point in the three-dimensional point cloud, a feature of the input point is enhanced based on neighborhood point features of the input point to obtain a corresponding first feature, an attention point corresponding to the input point is automatically learned based on the feature-enhanced first feature, a feature of the attention point is enhanced based on neighborhood point features of the learned attention point and is taken as a second feature of the corresponding input point, the feature of the input point is further enhanced by fusing the second feature of the input point to the corresponding first feature, and an enhanced feature with a better enhancement effect is obtained, so that a point cloud feature with a better enhancement effect can be obtained based on the enhanced feature of each input point, to improve an enhancement effect of the point cloud feature.

In one embodiment, step 106 includes: mapping the first feature of the input point to a target offset vector; and determining the corresponding attention point according to the input point and the target offset vector.

The target offset vector is a direction vector automatically learned based on the first feature of the input point. In this way, the attention point determined based on the target offset vector and the input point is referred to as a directed attention point.

In one embodiment, the terminal learns the target offset vector of the input point based on the first feature of the input point, and determines the corresponding attention point according to an input point vector corresponding to the input point and the target offset vector. In this way, the terminal maps the first feature of the input point to the target offset vector, and takes it as a directional attention for further positioning the attention point. It may be understood that the input point vector may be a coordinate vector or a feature vector. Correspondingly, the target offset vector may be a coordinate offset vector or a feature offset vector.

In one embodiment, the terminal learns a target function D, maps the first feature of the input point to the corresponding target offset vector through the target function, determines a corresponding offset point based on the target offset vector and the input point, and takes the offset point as an attention point of the corresponding input point, which may specifically be shown by the following formula.

$$d_i = D(f_i)$$

where $f_i$ denotes a first feature of the input point $p_i$, and $d_i$ denotes an offset point of the input point $p_i$.

Figure 2:
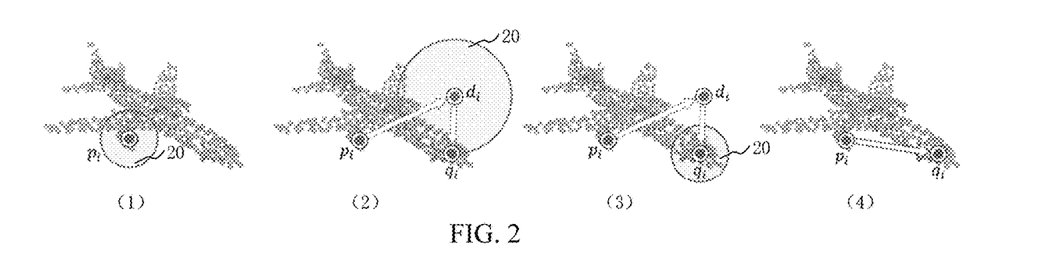
FIG. 2 is a schematic diagram of learning of attention points corresponding to input points according to an embodiment.

FIG. 2 is a schematic diagram of learning of attention points corresponding to input points according to an embodiment. As shown by Subfigure (1) in FIG. 2, for the input point $p_i$ in the three-dimensional point cloud, the terminal updates an initial feature of the input point based on neighborhood point features corresponding to neighborhood points in a neighborhood of the input point to obtain a corresponding first feature. A target offset vector of the input point is learned based on the first feature. The target offset vector is shown by an arrow between the input point $p_i$ and the offset point $d_i$ in Subfigure (2). The offset point $d_i$ as shown in Subfigure (2) is determined based on the input point and the target offset vector. The three-dimensional point cloud is searched, based on the offset point $d_i$, for an attention point $q_i$ as shown in Subfigure (2). As shown in Subfigure (3), the three-dimensional point cloud is searched for neighborhood point features in a neighborhood of the attention point $q_i$, and a feature of the attention point is updated based on the neighborhood point features. As shown in Subfigure (4), the offset point is automatically learned based on the first feature of the input point, and the attention point associated with the input point is found through the assistance of the offset point. The feature of the attention point may affect the feature of the input point. Therefore, the feature of the attention point obtained by updating based on the neighborhood point features is taken as a second feature of the input point $p_i$, and the second feature is fused with the corresponding first feature to obtain an enhanced feature of the input point $p_i$. It may be understood that a range represented by the reference sign 20 in FIG. 2 refers to a neighborhood of the input point, the offset point or the attention point. The neighborhood range shown in FIG. 2 is only used as an example only, and is not used as a specific limitation.

In the above embodiment, the target offset vector is automatically learned based on the first feature of the first point, to determine a corresponding attention point based on the target offset vector. In this way, the attention point of the input point is automatically learned, independent of feature similarity, so that the enhancement effect can be improved when the feature of the input point is further enhanced based on the neighborhood point features of the attention point.

In one embodiment, the target offset vector is a coordinate offset vector in a Euclidean space; and the step of determining the corresponding attention point according to the input point and the target offset vector includes: obtaining an offset point coordinate vector according to a coordinate vector of the input point in the Euclidean space and the coordinate offset vector; and determining the attention point corresponding to the corresponding input point according to the offset point coordinate vector.

The coordinate vector of the input point in the Euclidean space is determined by a three-dimensional coordinate of the input point in the three-dimensional space. For example, if the three-dimensional coordinate of the input point in the three-dimensional space is (x,y,z) the coordinate vector of the input point in the Euclidean space is [x,y,z]. The coordinate offset vector is a three-dimensional vector in the Euclidean space.

In one embodiment, the terminal maps the first feature of the input point to the corresponding coordinate offset vector in the Euclidean space, adds the coordinate offset vector with the coordinate vector of the corresponding input point in the Euclidean space to obtain the offset point coordinate vector, and determines the corresponding attention point in the Euclidean space according to the offset point coordinate vector.

In one embodiment, the terminal determines an offset point coordinate based on the offset point coordinate vector, and determines the attention point based on the offset point coordinate in the Euclidean space. It may be understood that, the terminal may determine the offset point coordinate as a coordinate of a to-be-searched attention point. Thus, the attention point can be directly determined based on the offset point coordinate; that is, the offset point is directly determined as the attention point. The terminal may also determine the corresponding offset point in the Euclidean space based on the offset point coordinate, and screen, from the three-dimensional point cloud, an input point closest to the offset point to serve as the attention point in the Euclidean space. It may be understood that, the distance according to the present embodiment refers to a vector distance between the coordinate vector of the input point and the offset point coordinate vector.

In the above embodiment, the corresponding coordinate offset vector is learned in the Euclidean space based on the first feature of the input point, and the attention point of the corresponding input point is determined in the Euclidean space based on the coordinate offset vector.

In one embodiment, the target offset vector is a feature offset vector in a feature space; and the step of determining the corresponding attention point according to the input point and the target offset vector includes: obtaining an offset point feature vector according to a feature vector of the input point in the feature space and the feature offset vector; and determining the attention point corresponding to the corresponding input point according to the offset point feature vector.

The feature vector of the input point in the feature space is determined from a feature of the input point in the feature space, and may be specifically determined from the first feature of the input point in the feature space. For example, if the first feature $f_i$ of the input point $p_i$ in the feature space is $(f_{i0}, f_{i1}, \ldots, f_{in})$, the feature vector of the input point in the feature space is $[f_{i0}, f_{i1}, \ldots, f_{in}]$. The feature offset vector is a multi-dimensional vector in the feature space, and the feature offset vector has a same dimension as the first feature.

In one embodiment, the terminal maps the first feature of the input point to the corresponding feature offset vector in the feature space, adds the feature offset vector with the feature vector of the corresponding input point in the feature space to obtain the offset point feature vector, and determines the corresponding attention point in the feature space according to the offset point feature vector.

In one embodiment, the terminal determines an offset point feature based on the offset point feature vector, and determines the attention point based on the offset point feature in the feature space. The terminal may determine the offset point feature as a feature of the to-be-searched attention point. Thus, the attention point can be directly determined based on the offset point feature; that is, the offset point is directly determined as the attention point. The terminal may also determine the corresponding offset point in the feature space based on the offset point feature, and screen, from the three-dimensional point cloud, an input point closest to the offset point to serve as the attention point in the feature space. It may be understood that, the distance according to the present embodiment refers to a vector distance between the feature vector of the input point and the offset point feature vector.

In the above embodiment, the corresponding feature offset vector is learned in the feature space based on the first feature of the input point, and the attention point of the corresponding input point is determined in the feature space based on the feature offset vector.

In one embodiment, the step of mapping the first feature of the input point to a target offset vector includes: mapping the first feature of each input point in the three-dimensional point cloud to the corresponding target offset vector through a multi-layer perceptron sharing parameters.

In one embodiment, for each input point in the three-dimensional point cloud, the terminal maps the first feature of the input point to the target offset vector through the multi-layer perceptron sharing parameters. In this way, the multi-layer perceptron configured to map the first feature of each input point to the corresponding target offset vector is parameter-sharing; that is, the multi-layer perceptron shares parameters among all input points in the three-dimensional point cloud.

In one embodiment, in the Euclidean space, the terminal maps the first feature of each input point to a coordinate offset vector through a small-sized multi-layer perceptron, and further determines the corresponding attention point based on the coordinate offset vector. The terminal may specifically determine an offset point corresponding to the input point in the Euclidean space in the following manner, and determines the corresponding attention point based on the offset point with the attention point determination method according to one or more embodiments in the present disclosure.

$$d_i = MLP(f_i) + x_i$$

where $f_i$ denotes a first feature of the input point $p_i$, $d_i$ denotes an offset point of the input point $p_t$ in the Euclidean space, $MLP(f_i)$ denotes a coordinate offset vector obtained by mapping the first feature $f_i$ in the Euclidean space through the multi-layer perceptron MLP, and $x_i$ denotes a coordinate vector of the input point $p_i$ in the Euclidean space.

It may be understood that, the attention point learned in the Euclidean space is not necessarily a certain point in the three-dimensional point cloud, which may be at any position in the Euclidean space.

In one embodiment, in the feature space, the terminal maps the first feature of each input point to a feature offset vector through the small-sized multi-layer perceptron. The terminal may specifically determine an offset point corresponding to the input point in the feature space in the following manner, and further determines the attention point based on the offset point.

$$d_{f_i} = MLP(f_i) + f_i$$

where $f_i$ denotes a first feature of the input point $p_i$, that is, denotes a feature vector of the input point $p_i$ in the feature space, $d_{f_i}$ denotes an offset point of the input point $p_i$ in the feature space, and $MLP(f_i)$ denotes a feature offset vector obtained by mapping the first feature $f_i$ in the feature space through the multi-layer perceptron MLP.

It may be understood that, the feature offset vector learned in the feature space is not necessarily a feature vector of a certain point in the three-dimensional point cloud, and the attention point learned in the feature space is not necessarily a certain point in the three-dimensional point cloud, which may be at any position in the feature space.

In one embodiment, step 108 includes: determining neighborhood points and the corresponding neighborhood point features of the attention point from the three-dimensional point cloud; and performing feature aggregation on the determined neighborhood point features through local convolution to obtain the second feature of the input point corresponding to the corresponding attention point.

In one embodiment, for the attention point corresponding to each input point in the three-dimensional point cloud, the terminal calculates a distance between the attention point and each input point in the three-dimensional point cloud, screens neighborhood points of the attention point from the three-dimensional point cloud based on the distance, and acquires a neighborhood point feature corresponding to each neighborhood point. Further, local convolution is performed on neighborhood point features corresponding to the attention point to aggregate the neighborhood point features, and the aggregated feature is taken as the second feature of the input point corresponding to the attention point. It is to be noted that, similar to the manner of screening the neighborhood points of the input point from the three-dimensional point cloud based on the distances, the terminal screens the neighborhood points of the attention point from the three-dimensional point cloud based on the distances, which is not described in detail herein.

In one embodiment, the terminal performs feature aggregation on neighborhood point features of each attention point through local convolution to obtain a second feature of the corresponding input point. The terminal may specifically perform a local convolution operation on the neighborhood point features of each attention point to obtain the second feature of the corresponding input point in the following manner.

$$f_{q_i} = \text{LocalConv2}(N(q_i))$$

where $q_i$ denotes an attention point corresponding to the $i^{th}$ input point $p_i$ in the three-dimensional point cloud, $N(q_i)$ denotes a neighborhood point set of the attention point $q_i$, $f_{q_i}$ denotes a second feature of the input point $p_i$, and LocalConv2 denotes any local convolution operator. It may be understood that LocalConv1 and LocalConv2 may be identical or different, but they do not share parameters.

In the above embodiment, the feature of the corresponding attention point is updated based on the neighborhood points and the corresponding neighborhood point features of the attention point in the three-dimensional space, and serves as the second feature of the corresponding input point, so that the feature enhancement feature can be improved when the corresponding first feature is enhanced based on the second feature of the input point.

In one embodiment, the step of determining neighborhood points and the corresponding neighborhood point features of the attention point from the three-dimensional point cloud includes: determining a preset number of neighborhood points and corresponding neighborhood point features from the three-dimensional point cloud according to a coordinate vector of the attention point; or determining a preset number of neighborhood points and corresponding neighborhood point features from the three-dimensional point cloud according to a feature vector of the attention point.

In one embodiment, in the Euclidean space, each input point in the three-dimensional point cloud and the corresponding attention point correspond to coordinate vectors respectively. For each attention point, a vector distance between the attention point and each input point in the three-dimensional point cloud can be determined according to the coordinate vector of the attention point and the coordinate vector of the corresponding input point. In the feature space, each input point in the three-dimensional point cloud and the corresponding attention point correspond to feature vectors respectively. For each attention point, a vector distance between the attention point and each input point in the three-dimensional point cloud can be determined according to the feature vector of the attention point and the feature vector of the corresponding input point. Thus, in the Euclidean space or the feature space, a preset number of input points can be screened out, based on the vector distance corresponding to each attention point, from the three-dimensional point cloud as neighborhood points of the attention point, and neighborhood point features corresponding to the neighborhood points are acquired. It may be understood that, for the attention point in the Euclidean space, neighborhood points of the attention point are screened in the Euclidean space; for the attention point in the feature space, neighborhood points of the attention point are screened in the feature space.

It may be understood that, the coordinate vector corresponding to the attention point/input point in the Euclidean space is determined based on a three-dimensional coordinate of the attention point/input point in the Euclidean space. Correspondingly, the feature vector corresponding to the attention point/input point in the feature space is determined based on a feature of the attention point/input point in the feature space. A dimension of the feature vector is determined by a number of channels of the feature.

In one embodiment, in the Euclidean space or the feature space, the terminal may determine the neighborhood points of the attention point in an existing KNN (K-Nearest Neighbor) manner, which is not described in detail herein.

In the above embodiment, the neighborhood points and the neighborhood point features of the attention point can be determined from the corresponding space based on the coordinate vector or the feature vector of the attention point, to further enhance the feature of the corresponding input point based on the determined neighborhood point features.

Figure 3:
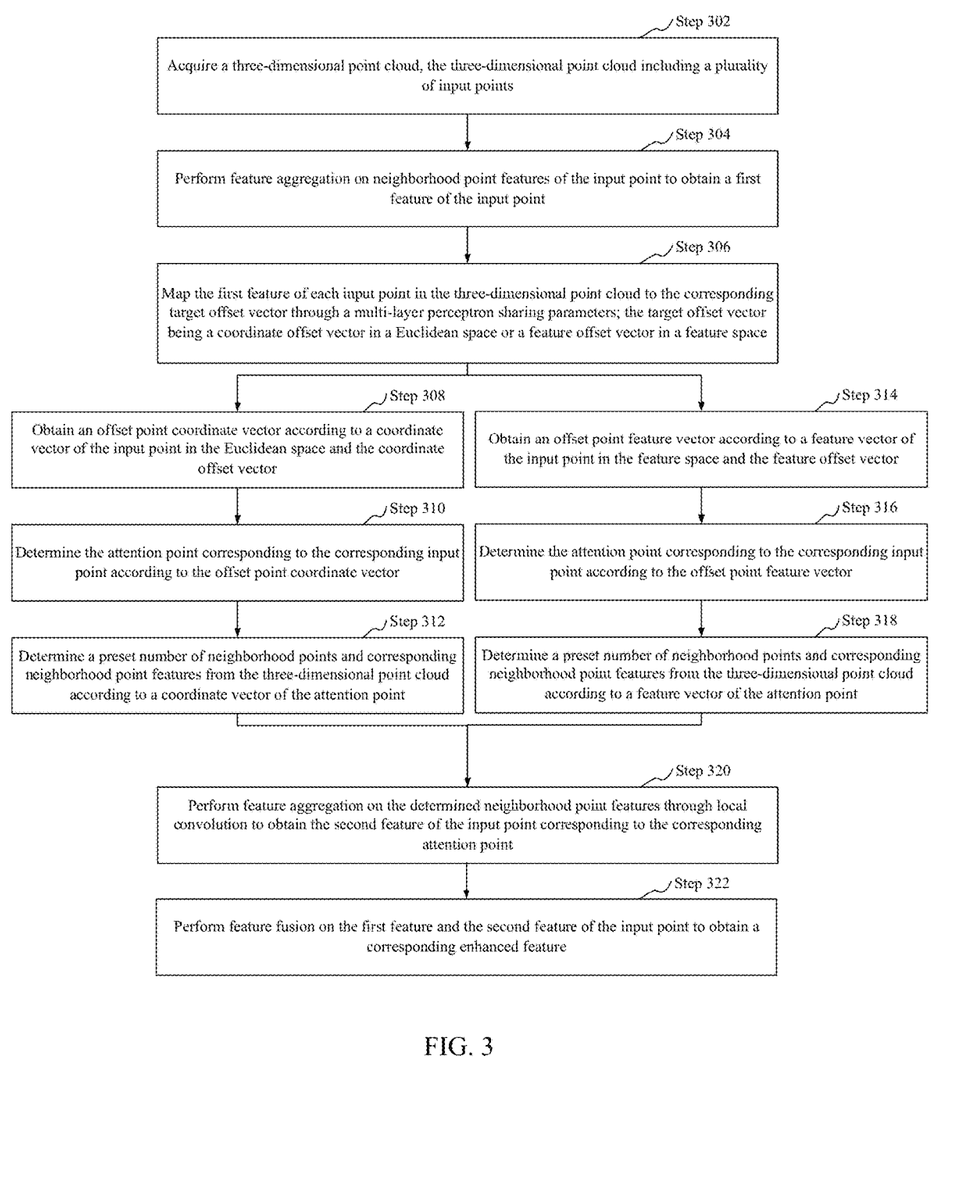
FIG. 3 is a schematic flowchart of a point cloud feature enhancement method according to another embodiment.

FIG. 3 is a schematic flowchart of a point cloud feature enhancement method according to another embodiment. As shown in FIG. 3, the method specifically includes the following steps.

In step 302, a three-dimensional point cloud is acquired, the three-dimensional point cloud including a plurality of input points.

In step 304, feature aggregation is performed on neighborhood point features of the input point to obtain a first feature of the input point.

In step 306, the first feature of each input point in the three-dimensional point cloud is mapped to the corresponding target offset vector through a multi-layer perceptron sharing parameters; the target offset vector is a coordinate offset vector in a Euclidean space or a feature offset vector in a feature space.

In step 308, an offset point coordinate vector is obtained according to a coordinate vector of the input point in the Euclidean space and the coordinate offset vector.

In step 310, the attention point corresponding to the corresponding input point is determined according to the offset point coordinate vector.

In step 312, a preset number of neighborhood points and corresponding neighborhood point features are determined from the three-dimensional point cloud according to a coordinate vector of the attention point.

In step 314, an offset point feature vector is obtained according to a feature vector of the input point in the feature space and the feature offset vector.

In step 316, the attention point corresponding to the corresponding input point is determined according to the offset point feature vector.

In step 318, a preset number of neighborhood points and corresponding neighborhood point features are determined from the three-dimensional point cloud according to a feature vector of the attention point.

In step 320, feature aggregation is performed on the determined neighborhood point features through local convolution to obtain the second feature of the input point corresponding to the corresponding attention point.

In step 322, feature fusion is performed on the first feature and the second feature of the input point to obtain a corresponding enhanced feature.

In the above embodiment, the corresponding target offset vector is learned based on the first feature of the input point in the Euclidean space or the feature space, and an attention point more conducive to a subsequent ask is positioned from the three-dimensional point cloud based on the target offset vector, to enhance learned point cloud features, so that the accuracy can be improved when the learned point cloud features are used for the subsequent task such as point cloud segmentation or point cloud classification.

In one embodiment, the point cloud feature enhancement method according to one or more embodiments of the present disclosure is implemented by a point cloud learning network. The point cloud learning network is a deep neural network based on an attention mechanism. Since a main function of the point cloud learning network is to automatically learn a directed attention point of an input point, the point cloud learning network may also be understood as a directed attention point convolutional network.

Figure 4:
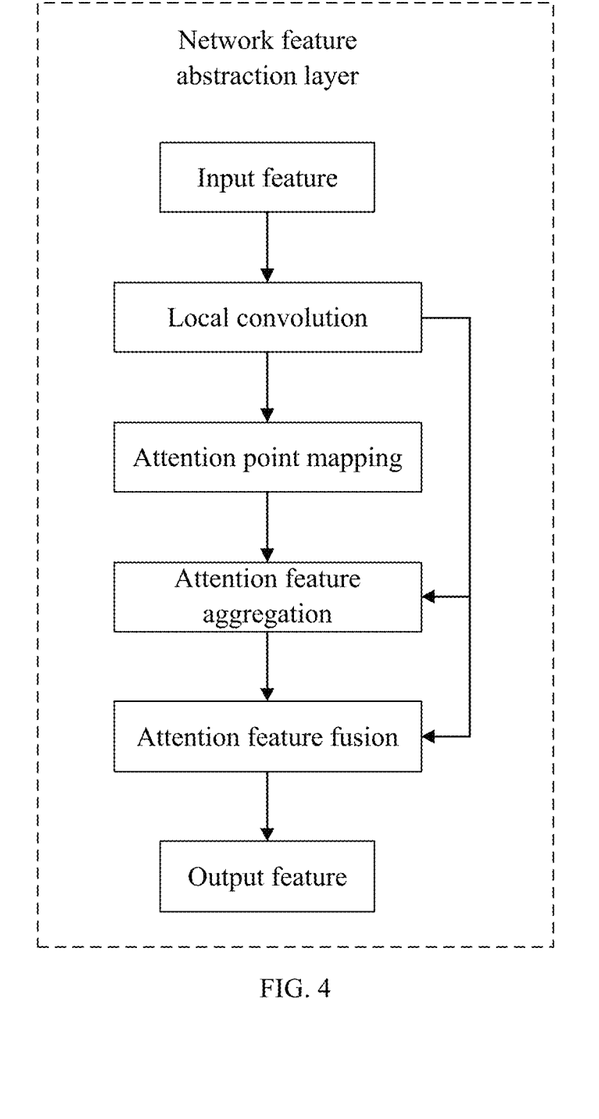
FIG. 4 is a frame diagram of implementation of a point cloud feature enhancement method based on a point cloud learning network according to an embodiment.

FIG. 4 is a frame diagram of implementation of a point cloud feature enhancement method based on a point cloud learning network according to an embodiment. As shown in FIG. 4, a network feature abstraction layer of the point cloud learning network is provided, which specifically includes: taking an initial feature of each input point in the three-dimensional point cloud as an input feature of the point cloud learning network, updating the initial feature of each input point through a local convolution device to obtain a corresponding first feature, mapping the first feature of each input point to a corresponding attention point through an attention point mapping device, obtaining a second feature of the corresponding input point by aggregating neighborhood point features from a neighborhood of the attention point through an attention feature aggregation device, integrating the second feature of each input point into the corresponding first feature through an attention point feature fusion device to obtain an enhanced feature, and taking the enhanced feature of each input point as an output feature of the input point in the point cloud learning network.

Figure 5:
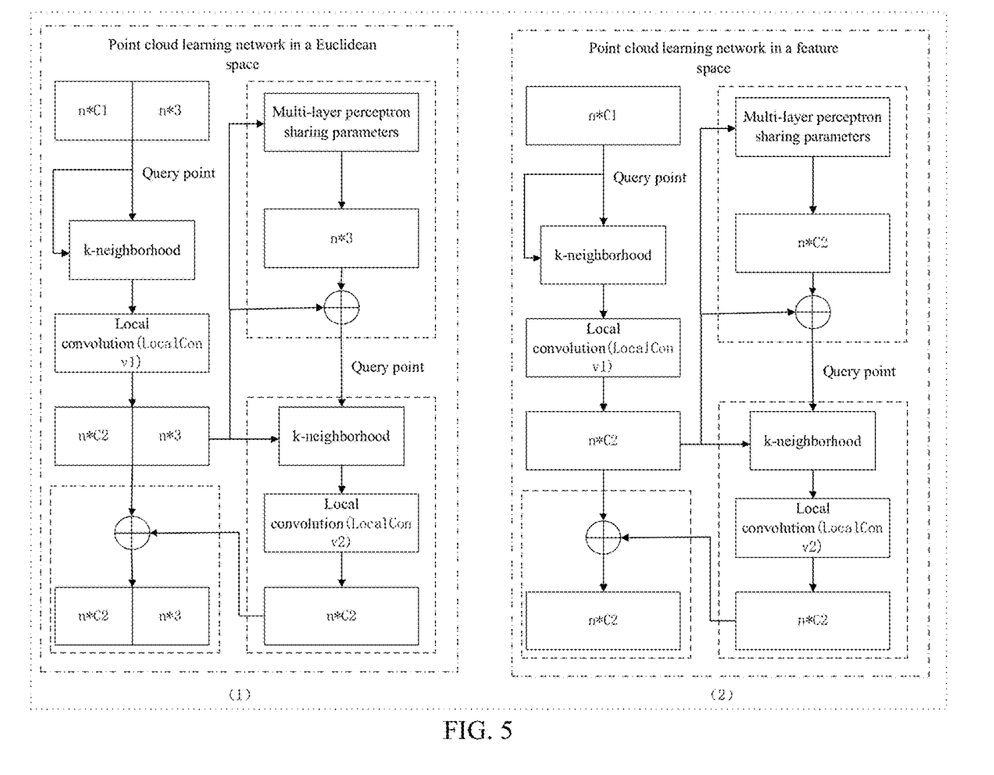
FIG. 5 is a schematic diagram of a point cloud learning network according to an embodiment.

FIG. 5 is a schematic diagram of a point cloud learning network according to an embodiment. Subfigure (1) and Subfigure (2) in FIG. 5 provide schematic diagrams of point cloud learning networks in a Euclidean space and a feature space respectively. As shown by Subfigure (1) and Subfigure (2), the point cloud learning networks in the Euclidean space and the feature space are of a similar structure. A three-dimensional point cloud inputted to the point cloud learning network includes n input points. A feature dimension of each input point is C1, and a coordinate dimension of each input point is 3. For each input point in the three-dimensional point cloud, the input point is taken as a query point to search the three-dimensional point cloud for neighborhood points and corresponding neighborhood point features of the input point by k-neighborhood. Local convolution is performed on the neighborhood point features to obtain a first feature of the input point. The first feature of the input point is mapped to a corresponding target offset vector through a multi-layer perceptron sharing parameters. An attention point of the input point is determined according to the input point and the target offset vector. The attention point is taken as a query point to search the three-dimensional point cloud for neighborhood points and corresponding neighborhood point features of the attention point by k-neighborhood. Local convolution is performed on the neighborhood point features to obtain a second feature of the corresponding input point. Feature fusion is performed on the first feature and the second feature of the input point to obtain an enhanced feature. Feature dimensions of the first feature, the second feature and the enhanced feature corresponding to each input point are all C2.

Differences between the point cloud learning networks in the Euclidean space and the feature space are as follows. In the Euclidean space, the first feature of the input point is mapped to a three-dimensional target offset vector through the multi-layer perceptron sharing parameters; that is, the first feature is mapped to a coordinate offset vector, and the attention point is determined based on the coordinate offset vector and a coordinate vector of the input point in the Euclidean space. In the feature space, the first feature of the input point is mapped to a feature offset vector having a same dimension as the first feature, and the attention point is determined based on the feature offset vector and a coordinate vector of the input point in the feature space. It may be understood that, during the enhancement of the feature of the input point through point cloud learning network, the feature dimension may be changed, but the coordinate dimension may remain unchanged. In this way, the target offset vector of each input point is learned in the Euclidean space or the feature space through the point cloud learning network, an attention point more conducive to a subsequent ask is positioned from the three-dimensional point cloud based on the target offset vector, and learned point cloud features are enhanced based on the attention point.

It may be understood that, for each input point in the three-dimensional point cloud, an attention point is learned through the point cloud learning network according to the present disclosure, and the feature of the input point can be effectively enhanced based on the attention point, to improve a feature enhancement effect of the point cloud features. When the attention point of the input point is learned through the point cloud learning network, a position of the attention point is learned in a targeted manner according to different three-dimensional point clouds and different subsequent tasks. Moreover, the learned attention point is not necessarily a certain input point in the three-dimensional point cloud. In this way, the feature of the input point is further enhanced based on neighborhood point features of the attention point, so that neighborhood points with different features provide an important context for the input point to perform a target task. It is to be noted that the learned target offset vector is optimized by maximizing the performance of the task in a training point cloud learning network, to learn a better position of the attention point.

In one embodiment, various experiments show that the point cloud learning network according to the present disclosure can be integrated into various point cloud classification and segmentation networks as a sub-network, and has an improved effect. The point cloud learning network according to the present disclosure has been benchmarked against a variety of common data sets, such as a ModelNet40 data set for point cloud classification, a ShapeNetPart data set for point cloud component segmentation and an S3DIS data set for point cloud indoor scene semantic segmentation. A large number of model experiments on such data sets show that the point cloud learning network according to the present disclosure can improve the feature enhancement effect compared with the existing feature enhancement method.

It is to be understood that, although the steps in the flowcharts of FIG. 1 and FIG. 3 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 1 and FIG. 3 may include a plurality of steps or a plurality of stages, and the steps or stages are not necessarily performed at a same moment, and may be performed at different moments. The steps or stages are not necessarily performed in sequence, and may be performed in turn or alternately with at least some of other steps or steps or stages of other steps.

Figure 6:
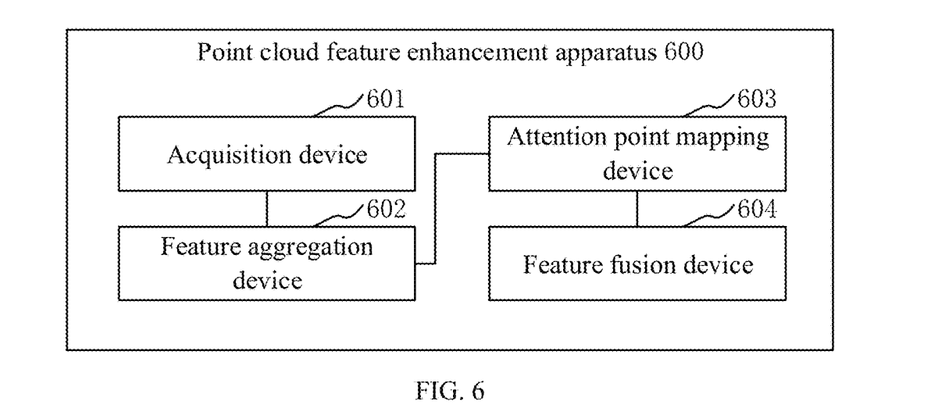
FIG. 6 is a structural block diagram of a point cloud feature enhancement apparatus according to an embodiment.

In one embodiment, as shown in FIG. 6, a point cloud feature enhancement apparatus 600 is provided, including: an acquisition device 601, a feature aggregation device 602, an attention point mapping device 603 and a feature fusion device 604.

The acquisition device 601 is configured to acquire a three-dimensional point cloud, the three-dimensional point cloud including a plurality of input points.

The feature aggregation device 602 is configured to perform feature aggregation on neighborhood point features of the input point to obtain a first feature of the input point.

The attention point mapping device 603 is configured to map the first feature to an attention point corresponding to the corresponding input point.

The feature aggregation device 602 is further configured to perform feature aggregation on neighborhood point features of the attention point to obtain a second feature of the corresponding input point.

The feature fusion device 604 is configured to perform feature fusion on the first feature and the second feature of the input point to obtain a corresponding enhanced feature.

In one embodiment, the attention point mapping device 603 is further configured to map the first feature of the input point to a target offset vector; and determine the corresponding attention point according to the input point and the target offset vector.

In one embodiment, the target offset vector is a coordinate offset vector in a Euclidean space; and the attention point mapping device 603 is further configured to obtain an offset point coordinate vector according to a coordinate vector of the input point in the Euclidean space and the coordinate offset vector; and determine the attention point corresponding to the corresponding input point according to the offset point coordinate vector.

In one embodiment, the target offset vector is a feature offset vector in a feature space; and the attention point mapping device 603 is further configured to obtain an offset point feature vector according to a feature vector of the input point in the feature space and the feature offset vector; and determine the attention point corresponding to the corresponding input point according to the offset point feature vector.

In one embodiment, the attention point mapping device 603 is further configured to map the first feature of each input point in the three-dimensional point cloud to the corresponding target offset vector through a multi-layer perceptron sharing parameters.

In one embodiment, the feature aggregation device 602 is further configured to determine neighborhood points and the corresponding neighborhood point features of the attention point from the three-dimensional point cloud; and perform feature aggregation on the determined neighborhood point features through local convolution to obtain the second feature of the input point corresponding to the corresponding attention point.

In one embodiment, the feature aggregation device 602 is further configured to determine a preset number of neighborhood points and corresponding neighborhood point features from the three-dimensional point cloud according to a coordinate vector of the attention point; or determine a preset number of neighborhood points and corresponding neighborhood point features from the three-dimensional point cloud according to a feature vector of the attention point.

The specific limitation to the point cloud feature enhancement apparatus may be obtained with reference to the limitation to the point cloud feature enhancement method hereinabove, and is not described in detail herein. The devices in the point cloud feature enhancement apparatus may be implemented entirely or partially by software, hardware, or a combination thereof. The above devices may be built in or independent of a processor of a computer device in a hardware form, or may be stored in a memory of the computer device in a software form, so that the processor invokes and performs operations corresponding to the above devices.

Figure 7:
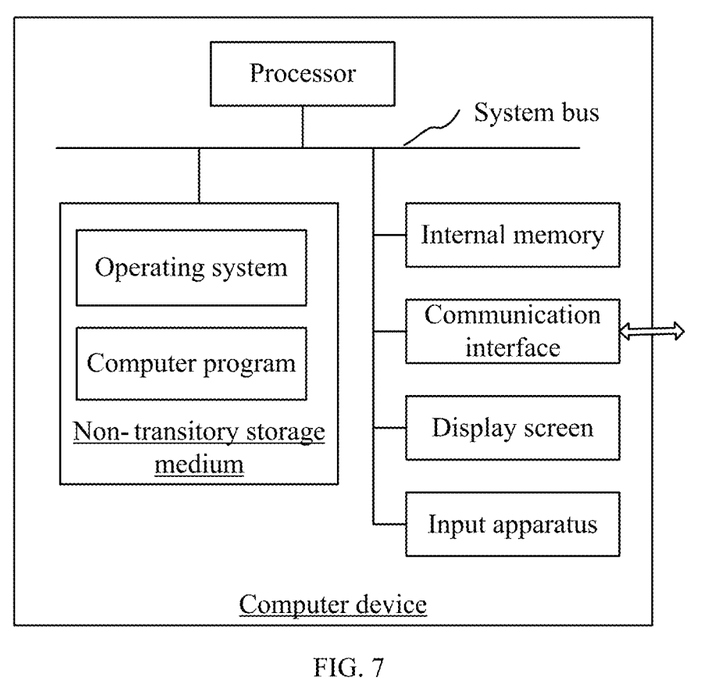
FIG. 7 is an internal structure diagram of a computer device according to an embodiment.

In one embodiment, a computer device is provided. The computer device may be a terminal, and an internal structure diagram is shown in FIG. 7. The computer device includes a processor, a memory, a communication interface, a display screen, and an input apparatus that are connected by using a system bus. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory storage medium. The communication interface of the computer device is configured to communicate with an external terminal in a wired or wireless manner. The wireless manner may be implemented by WIFI, a service provider network, NFC (Near field communication) or other technologies. The computer program is executed by the processor to implement a point cloud feature enhancement method. The display screen of the computer device may be a liquid crystal display screen or an electronic ink display screen. The input apparatus of the computer device may be a touchscreen covering the display screen, or may be a key, a trackball, or a touchpad disposed on a housing of the computer device, or may be an external keyboard, a touchpad, a mouse, or the like.

In one embodiment, in the structure shown in FIG. 7, only a block diagram of a partial structure related to the solution in the present disclosure is shown, which does not constitute a limitation to the computer device to which the solution in the present disclosure is applied. In one embodiment, the computer device may include more or fewer components than those shown in the figure, or some components may be combined, or a different component deployment may be used.

In one embodiment, a computer device is provided, including a memory and a processor. The memory stores a computer program. The processor, when executing the computer program, implements the following steps: acquiring a three-dimensional point cloud, the three-dimensional point cloud including a plurality of input points; performing feature aggregation on neighborhood point features of the input point to obtain a first feature of the input point; mapping the first feature to an attention point corresponding to the corresponding input point; performing feature aggregation on neighborhood point features of the attention point to obtain a second feature of the corresponding input point; and performing feature fusion on the first feature and the second feature of the input point to obtain a corresponding enhanced feature.

In one embodiment, the processor, when executing the computer program, further implements the following steps:

mapping the first feature of the input point to a target offset vector; and determining the corresponding attention point according to the input point and the target offset vector.

In one embodiment, the target offset vector is a coordinate offset vector in a Euclidean space; and the processor, when executing the computer program, further implements the following steps: obtaining an offset point coordinate vector according to a coordinate vector of the input point in the Euclidean space and the coordinate offset vector; and determining the attention point corresponding to the corresponding input point according to the offset point coordinate vector.

In one embodiment, the target offset vector is a feature offset vector in a feature space; and the processor, when executing the computer program, further implements the following steps: obtaining an offset point feature vector according to a feature vector of the input point in the feature space and the feature offset vector; and determining the attention point corresponding to the corresponding input point according to the offset point feature vector.

In one embodiment, the processor, when executing the computer program, further implements the following step: mapping the first feature of each input point in the three-dimensional point cloud to the corresponding target offset vector through a multi-layer perceptron sharing parameters.

In one embodiment, the processor, when executing the computer program, further implements the following steps: determining neighborhood points and the corresponding neighborhood point features of the attention point from the three-dimensional point cloud; and performing feature aggregation on the determined neighborhood point features through local convolution to obtain the second feature of the input point corresponding to the corresponding attention point.

In one embodiment, the processor, when executing the computer program, further implements the following steps: determining a preset number of neighborhood points and corresponding neighborhood point features from the three-dimensional point cloud according to a coordinate vector of the attention point; or determining a preset number of neighborhood points and corresponding neighborhood point features from the three-dimensional point cloud according to a feature vector of the attention point.

In one embodiment, a computer-readable storage medium is provided, having a computer program stored thereon. When the computer program is executed by a processor, the following steps are implemented: acquiring a three-dimensional point cloud, the three-dimensional point cloud including a plurality of input points; performing feature aggregation on neighborhood point features of the input point to obtain a first feature of the input point; mapping the first feature to an attention point corresponding to the corresponding input point; performing feature aggregation on neighborhood point features of the attention point to obtain a second feature of the corresponding input point; and performing feature fusion on the first feature and the second feature of the input point to obtain a corresponding enhanced feature.

In one embodiment, when the computer program is executed by the processor, the following steps are further implemented: mapping the first feature of the input point to a target offset vector; and determining the corresponding attention point according to the input point and the target offset vector.

In one embodiment, the target offset vector is a coordinate offset vector in a Euclidean space; and when the computer program is executed by the processor, the following steps are further implemented: obtaining an offset point coordinate vector according to a coordinate vector of the input point in the Euclidean space and the coordinate offset vector; and determining the attention point corresponding to the corresponding input point according to the offset point coordinate vector.

In one embodiment, the target offset vector is a feature offset vector in a feature space; and when the computer program is executed by the processor, the following steps are further implemented: obtaining an offset point feature vector according to a feature vector of the input point in the feature space and the feature offset vector; and determining the attention point corresponding to the corresponding input point according to the offset point feature vector.

In one embodiment, when the computer program is executed by the processor, the following step is further implemented: mapping the first feature of each input point in the three-dimensional point cloud to the corresponding target offset vector through a multi-layer perceptron sharing parameters.

In one embodiment, when the computer program is executed by the processor, the following steps are further implemented: determining neighborhood points and the corresponding neighborhood point features of the attention point from the three-dimensional point cloud; and performing feature aggregation on the determined neighborhood point features through local convolution to obtain the second feature of the input point corresponding to the corresponding attention point.

In one embodiment, when the computer program is executed by the processor, the following steps are further implemented: determining a preset number of neighborhood points and corresponding neighborhood point features from the three-dimensional point cloud according to a coordinate vector of the attention point; or determining a preset number of neighborhood points and corresponding neighborhood point features from the three-dimensional point cloud according to a feature vector of the attention point.

The above embodiments may be implemented by a computer-readable instruction instructing related hardware, the program may be stored in a non-transitory computer-readable storage medium, and when the program is executed, the procedures in the above method embodiments may be implemented. Any reference to a memory, a storage, a database, or other media used in the embodiments provided in the present disclosure may include at least one of a non-transitory memory and a transitory memory. The non-transitory memory may include a read-only memory (ROM), a magnetic tape, a floppy disk, a flash memory, an optical memory or the like. The transitory memory may include a random access memory (RAM) or an external high-speed cache memory. By way of illustration and not limitation, the RAM is available in a variety of forms, such as a Static Random Access Memory (SRAM), a Dynamic Random Access Memory (DRAM) or the like.

The invention claimed is:

1. A point cloud feature enhancement method, comprising:
  acquiring a three-dimensional point cloud, the three-dimensional point cloud comprising a plurality of input points;
  performing feature aggregation on neighborhood point features of the input point to obtain a first feature of the input point;
  mapping the first feature of the input point to a target offset vector;

determining a corresponding attention point according to the input point and the target offset vector;

performing feature aggregation on neighborhood point features of the attention point to obtain a second feature of the corresponding input point;

performing feature fusion on the first feature and the second feature of the input point to obtain a corresponding enhanced feature.

2. The method according to claim 1, wherein the target offset vector is a coordinate offset vector in a Euclidean space; and the step of determining the corresponding attention point according to the input point and the target offset vector comprises:

obtaining an offset point coordinate vector according to a coordinate vector of the input point in the Euclidean space and the coordinate offset vector;

determining the attention point corresponding to the corresponding input point according to the offset point coordinate vector.

3. The method according to claim 1, wherein the target offset vector is a feature offset vector in a feature space; and the step of determining the corresponding attention point according to the input point and the target offset vector comprises:

obtaining an offset point feature vector according to a feature vector of the input point in the feature space and the feature offset vector;

determining the attention point corresponding to the corresponding input point according to the offset point feature vector.

4. The method according to claim 1, wherein the step of mapping the first feature of the input point to a target offset vector comprises:

mapping the first feature of each input point in the three-dimensional point cloud to the corresponding target offset vector through a multi-layer perceptron sharing parameters.

5. The method according to claim 1, wherein the step of performing feature aggregation on neighborhood point features of the attention point to obtain a second feature of the corresponding input point comprises:

determining neighborhood points and the corresponding neighborhood point features of the attention point from the three-dimensional point cloud;

performing feature aggregation on the determined neighborhood point features through local convolution to obtain the second feature of the input point corresponding to the corresponding attention point.

6. The method according to claim 5, wherein the step of determining neighborhood points and the corresponding neighborhood point features of the attention point from the three-dimensional point cloud comprises:

determining a preset number of neighborhood points and corresponding neighborhood point features from the three-dimensional point cloud according to a coordinate vector of the attention point; or determining a preset number of neighborhood points and corresponding neighborhood determining a preset number of neighborhood points and corresponding neighborhood point features from the three-dimensional point cloud according to a feature vector of the attention point.

7. A computer device, comprising a memory and a processor, the memory storing a computer program, wherein the processor, when executing the computer program, implements steps of the method according to claim 1.

8. A computer-readable storage medium, having a computer program stored thereon, wherein steps of the method according to claim 1 are implemented when the computer program is executed by a processor.

9. A point cloud feature enhancement apparatus, comprising:

an acquisition module configured to acquire a three-dimensional point cloud, the three-dimensional point cloud comprising a plurality of input points;

a feature aggregation module configured to perform feature aggregation on neighborhood point features of the input point to obtain a first feature of the input point;

an attention point mapping module configured to map the first feature of the input point to a target offset vector; and determine a corresponding attention point according to the input point and the target offset vector;

the feature aggregation module being further configured to perform feature aggregation on neighborhood point features of the attention point to obtain a second feature of the corresponding input point;

a feature fusion module configured to perform feature fusion on the first feature and the second feature of the input point to obtain a corresponding enhanced feature.

* * * * *